(12) United States Patent
Hammond

(10) Patent No.: US 11,644,019 B2
(45) Date of Patent: May 9, 2023

(54) DELIVERY OF CHEMICALS

(71) Applicant: Clay L. Hammond, Corpus Christi, TX (US)

(72) Inventor: Clay L. Hammond, Corpus Christi, TX (US)

(*) Notice: Subject to any disclaimer, the term of this patent is extended or adjusted under 35 U.S.C. 154(b) by 938 days.

(21) Appl. No.: 16/541,092

(22) Filed: Aug. 14, 2019

(65) Prior Publication Data
US 2020/0056912 A1 Feb. 20, 2020

Related U.S. Application Data

(60) Provisional application No. 62/719,120, filed on Aug. 16, 2018.

(51) Int. Cl.
| | | |
|---|---|---|
| *G01F 1/00* | (2022.01) | |
| *F04B 23/02* | (2006.01) | |
| *F16L 25/06* | (2006.01) | |
| *F16L 41/08* | (2006.01) | |
| *F04B 51/00* | (2006.01) | |
| *F04B 49/02* | (2006.01) | |
| *F04B 13/00* | (2006.01) | |
| *G01F 25/00* | (2022.01) | |

(52) U.S. Cl.
CPC .............. *F04B 13/00* (2013.01); *F04B 23/02* (2013.01); *F04B 49/02* (2013.01); *F04B 51/00* (2013.01); *F16L 25/06* (2013.01); *F16L 41/08* (2013.01); *G01F 1/007* (2013.01); *G01F 25/0092* (2013.01)

(58) Field of Classification Search
CPC ...... G01F 1/007; G01F 25/0092; G01F 25/17; F04B 13/00; F04B 23/02; F04B 23/025; F04B 49/02; F04B 49/065; F04B 51/00; F16L 19/005; F16L 25/06; F16L 29/002; F16L 41/08
USPC ............... 702/45, 47, 55; 285/133.11–133.6; 417/300
See application file for complete search history.

(56) References Cited

U.S. PATENT DOCUMENTS

| | | | | |
|---|---|---|---|---|
| 1,355,450 | A | * 10/1920 | Carlson | ................... F16L 15/06 285/209 |
| 1,903,819 | A | 4/1933 | Kocher | |
| D240,131 | S | 6/1976 | Dwyer | |
| 4,073,304 | A | * 2/1978 | Lerner | .................... G01F 25/17 137/101.21 |
| D251,011 | S | 2/1979 | Krechel | |

(Continued)

FOREIGN PATENT DOCUMENTS

| | | | | |
|---|---|---|---|---|
| DE | 19503847 | A1 * | 8/1996 | ............ B60T 17/043 |
| EP | 0426266 | A1 * | 5/1991 | |

(Continued)

*Primary Examiner* — Alexander B Comley
(74) *Attorney, Agent, or Firm* — G. Turner Moller, Jr.

(57) ABSTRACT

A chemical delivery system connects to a chemical tank and includes a union connected to the tank outlet and providing an antirotation feature, in addition to threads, to prevent rotation of the assembly in response to asymmetric loads. A measuring tube alternately receives liquid from the tank and is isolated from the tank. While isolated from the tank, liquid is withdrawn from the tube by a pump under conditions allowing the pump to be calibrated. The assembly is cantilevered from the tank outlet and is of reduced length and weight producing a device which is not prone to overstress the tank outlet.

17 Claims, 3 Drawing Sheets

(56) References Cited

U.S. PATENT DOCUMENTS

| | | | |
|---|---|---|---|
| 4,230,347 A | 10/1980 | Williams | |
| 4,322,972 A * | 4/1982 | Karjala | G01F 25/17 137/546 |
| 4,538,445 A * | 9/1985 | Kenik | G01F 25/17 73/1.31 |
| 4,703,664 A | 11/1987 | Kirkpatrick | |
| 4,718,443 A * | 1/1988 | Adney | G01F 15/02 137/8 |
| 4,856,343 A * | 8/1989 | Hon | G01F 1/007 73/168 |
| 4,897,797 A * | 1/1990 | Free, Jr. | G01F 11/284 417/18 |
| 4,971,366 A | 11/1990 | Towsley | |
| 5,199,307 A * | 4/1993 | Onoda | G01F 3/08 73/861.78 |
| 5,199,308 A * | 4/1993 | Lawhon | G01F 23/266 73/866.5 |
| 5,746,454 A * | 5/1998 | Webb | F16L 19/005 285/354 |
| 6,438,895 B1 | 8/2002 | Fortier | |
| 7,063,276 B2 | 6/2006 | Newton | |
| 7,263,448 B2 * | 8/2007 | Brown | G01F 1/007 702/50 |
| 7,973,923 B2 | 7/2011 | Wynn | |
| 9,587,777 B1 * | 3/2017 | Stretcher | F16L 19/005 |
| 2003/0120438 A1 * | 6/2003 | Gray | F04B 51/00 702/47 |
| 2008/0105311 A1 | 5/2008 | Bulter | |
| 2014/0261848 A1 | 9/2014 | Roden | |
| 2016/0166755 A1 * | 6/2016 | Golarits | F04B 43/12 417/300 |

FOREIGN PATENT DOCUMENTS

| | | | | |
|---|---|---|---|---|
| FR | 2269020 A | * | 12/1975 | F16L 19/025 |
| FR | 2499241 A1 | * | 8/1982 | |
| FR | 2794238 A1 | * | 12/2000 | B67D 7/72 |
| GB | 2214164 A | * | 8/1989 | A01M 7/0092 |
| JP | 07101403 A | * | 4/1995 | |
| JP | 2004301622 A | * | 10/2004 | |

\* cited by examiner

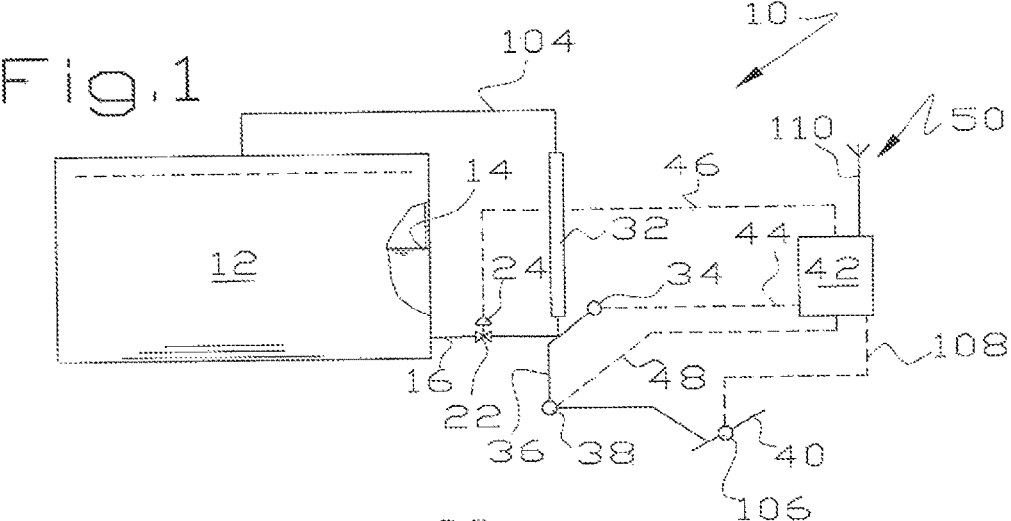
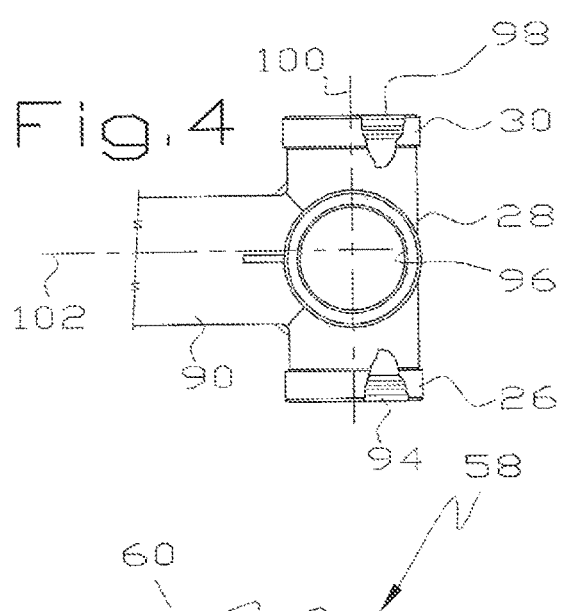
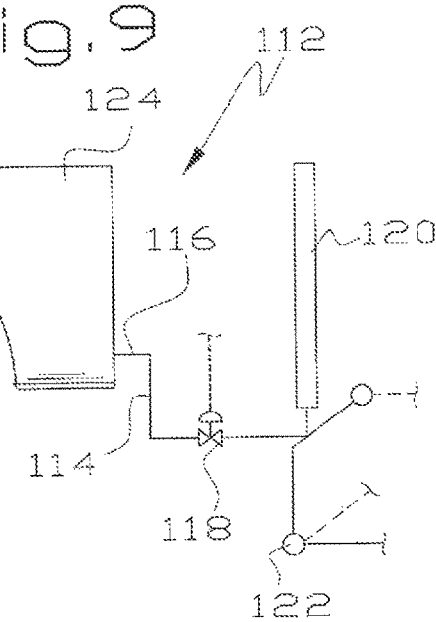
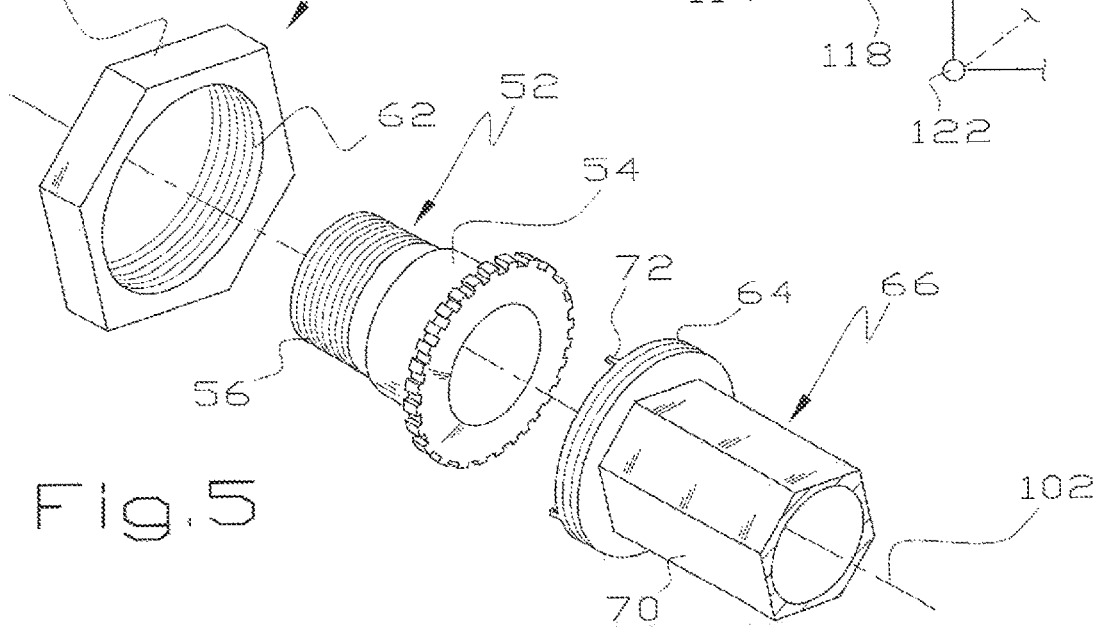

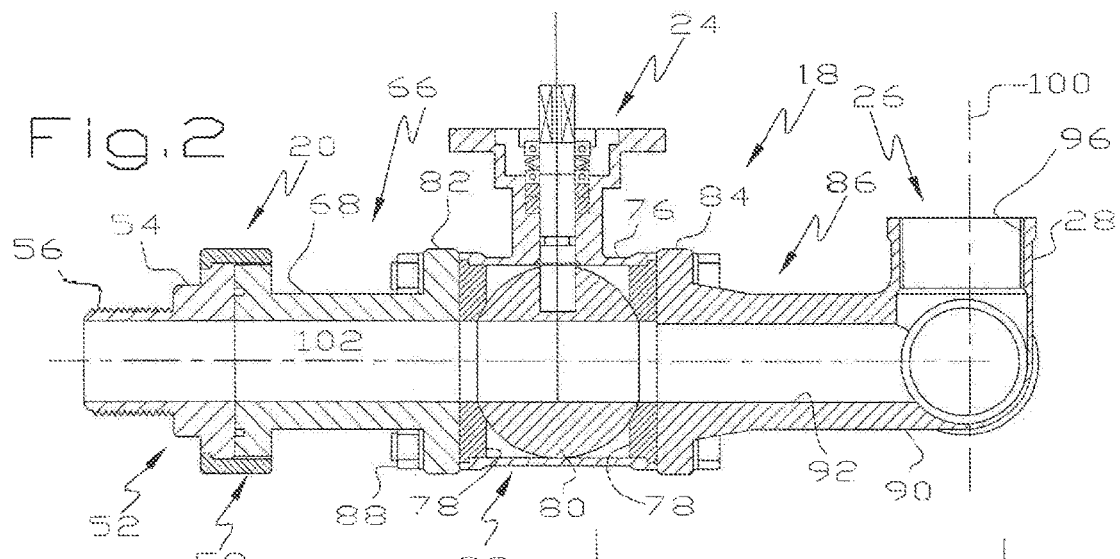
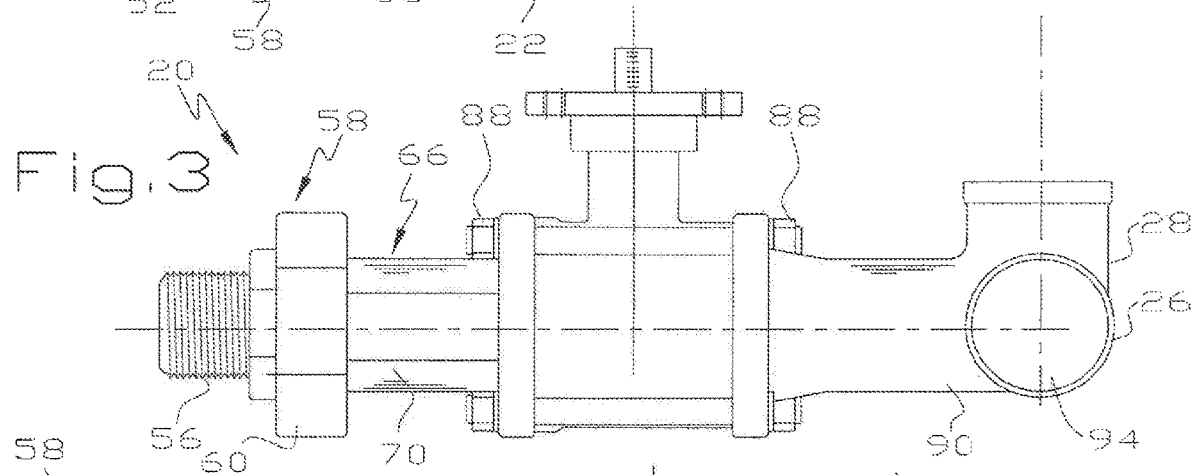
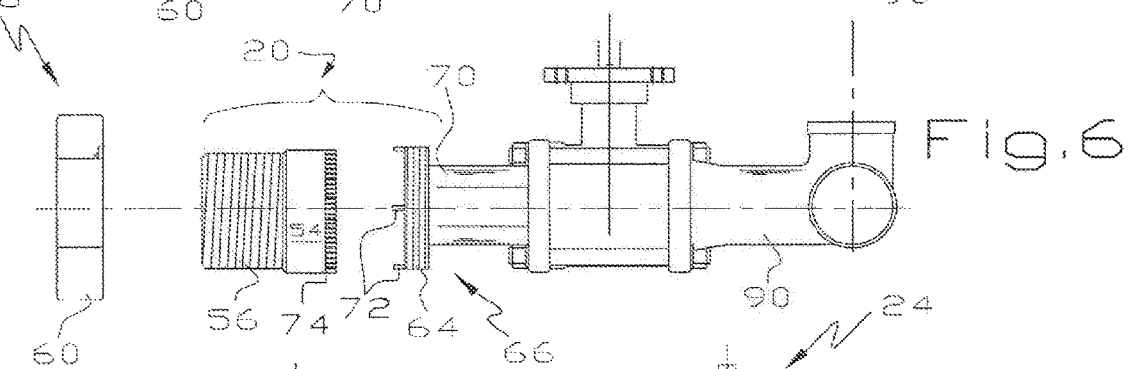
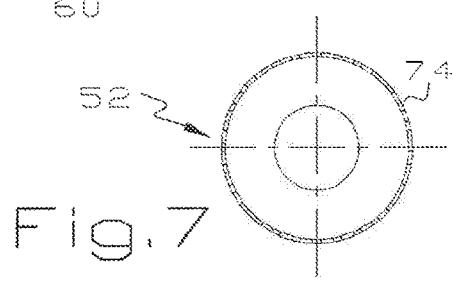
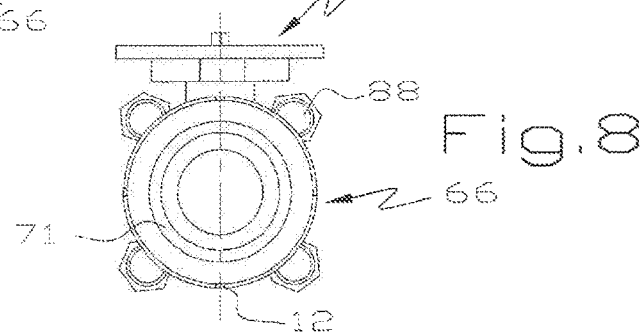

DELIVERY OF CHEMICALS

This invention relates to an improved system for delivering small amounts of chemicals into a stream of gas or liquid. This application is partially based on Application Ser. No. 62/719,120, filed Aug. 16, 2018, priority of which is claimed.

BACKGROUND OF THE INVENTION

This invention relates to an improved system for delivering small amounts of chemicals into a stream of gas or liquid. Although the invention will be described in connection with the operation of hydrocarbon wells, the same principles apply in many other situations.

In the operation of hydrocarbon wells, it is often necessary to inject a small quantity of chemical into a production stream. Some examples include the delivery of corrosion inhibitors, hydrogen sulfide scavengers, methane hydrate suppressors and the like. The production stream may be natural gas, liquid petroleum or a mixture of gas and liquid.

Because the chemicals are relatively expensive, it is important to deliver a sufficient quantity of chemical but not an excessive quantity. Chemicals are typically injected at very low rates compared to the quantity of the production stream. Volumes as low as one quart per day are not unusual and a few tens of quarts per day are very common. Because the production stream is flowing more-or-less continuously, chemical injection must be done more-or-less continuously so all of the chemical does not end up in a small volume of the production stream thereby starving the bulk of the production stream and over treating a very small part of it. It is a tribute to the industry that small capacity solar powered pumps have become quite efficient and are now ubiquitous for this purpose.

One approach to controlling chemical injection rates involves measuring or predicting the quantify of liquid in a supply tank. This approach is difficult and imprecise, mainly because the supply tank is huge compared to the quantity of injected chemical in each pump cycle and any inaccuracy in supply tank measurement massively exceeds pump deliverability so any attempt at calibrating a pump is futile.

A better approach is to provide a small vessel downstream of the supply tank and use this to either calibrate a small capacity pump or to isolate the supply tank while removing chemical from the small vessel. Disclosures of this type are found in U.S. Pat. Nos. 4,322,972; 4,538,445; 4,856,343; 5,199,307 and 7,263,448. It is this type device to which this invention most nearly relates.

This type system is not without its problems including cost, installation problems and maintenance difficulties.

BRIEF DESCRIPTION OF THE INVENTION

A chemical delivery system includes an assembly including a valve, measuring tube or sight glass, pump and controller. In one embodiment, the controller manipulates the valve to fill the measuring tube to a level that can be determined by a pressure or level sensor, closes the valve and then operates the pump to withdraw chemical from the measuring tube to determine how much volume was taken from the measuring tube per unit of pumping time or per pump stroke. In this manner, the pump can be calibrated so one knows how much chemical is injected per unit time or per pump stroke. This information can then be used to delivery a desired quantity of chemical until the next pump calibration.

To accomplish this, a special fitting includes a union for connection to a tank outlet and may include an antirotation device preventing the fitting from rotating, as might be allowed by threads alone, in respond to asymmetric torque loads on the fitting tending to rotate the fitting about a flow axis through the fitting. The fitting is designed to provide a series of outlets, one each for the measuring tube, pump conduit and pressure sensor. To minimize the torque load on the tank outlet, the fitting is of reduced length and is of light weight to reduce the gravity moment on the tank outlet. This is at least partially accomplished by placing at least two and preferably three of the outlets in a common plane.

An advantage of this device is the ability to transmit data to a central office where data from many similar devices may be monitored in an efficient manner. Data transmitted may include the calibrated rate of the pump, the height of liquid in the tank, condition of the power supply values such as voltage or amperage, control status of the pumping system, the volume delivered by the pump in some predetermined interval, such as hourly, daily or the like.

It is accordingly an object of this invention to provide an improved chemical delivery system.

Another object of this invention is to provide an improved approach for calibrating a small capacity pump in a chemical delivery system.

A further object of this invention is to provide a chemical delivery system which is cantilevered from the tank outlet of a supply tank and which imparts a very low load to the tank outlet.

Another object of this invention is to provide an improved chemical delivery system which is simple to install and maintain.

A further object of this invention is to provide an improved chemical delivery system which is capable of collecting considerable data and transmitting it to a central location which receives data from many remote locations.

These and other objects and advantages of this invention will become more fully apparent as this description proceeds, reference being made to the accompanying drawings and appended claims.

BRIEF DESCRIPTION OF THE DRAWINGS

FIG. 1 is a schematic view of the system of this invention;

FIG. 2 is a cross-sectional view of a valve assembly taken along the axis of the flow path through the valve;

FIG. 3 is a side view of the valve assembly of FIG. 2;

FIG. 4 is a top view of the outlet end of valve assembly of FIGS. 1 and 2;

FIG. 5 is an exploded isometric view of a torque transmitting union connecting a tank outlet to a valve assembly;

FIG. 6 is view similar to FIG. 3 showing one union half exploded off the end of the other union half;

FIG. 7 is an end view of a union half;

FIG. 8 is an end view of the opposite union half;

FIG. 9 is a partial schematic view of a modified system;

DETAILED DESCRIPTION OF THE INVENTION

Figure 10:
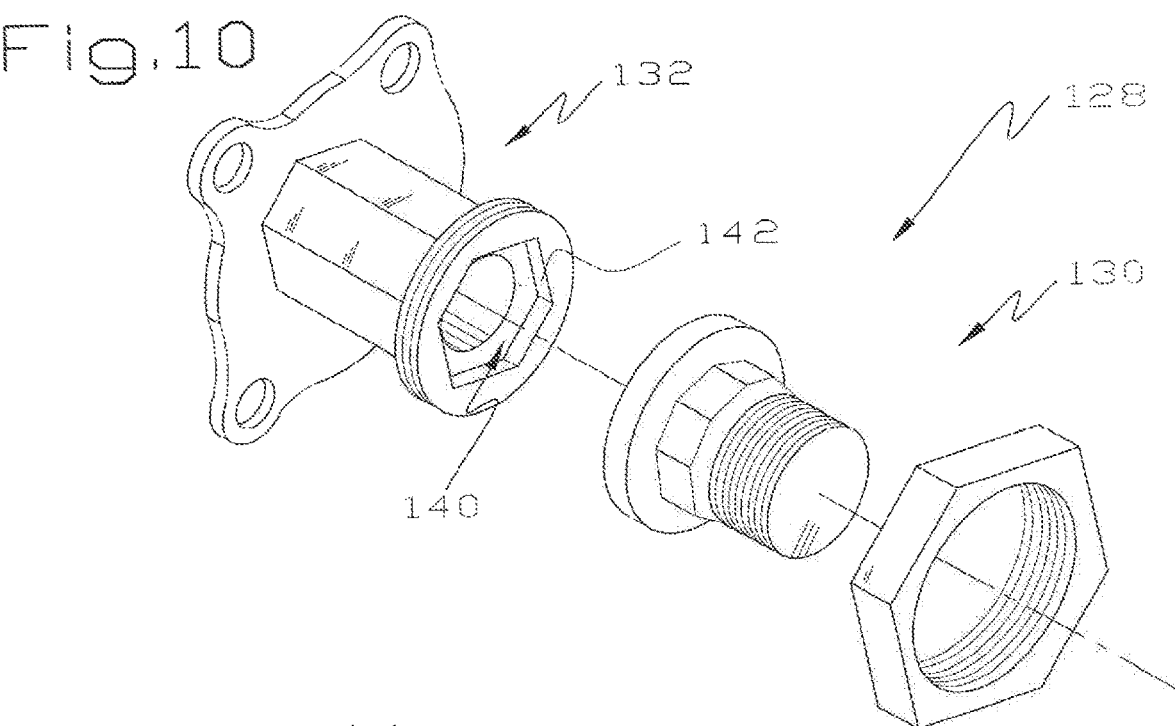
FIG. 10 is an isometric view of another embodiment of a union half.

The exact mode of operation of the chemical delivery system 10 is subject to considerable variation, e.g. it may use the operating approach of any of those disclosed in U.S. Pat. Nos. 4,322,972; 4,538,445; 4,856,343; 5,199,307; 7,263,448 and the like. It may be preferred, however, to use that in U.S. Pat. No. 4,856,343. Referring to FIG. 1, the chemical delivery system 10 includes a supply tank 12 having a liquid level 14. Oil field chemical tanks are typically cylindrical and horizontally positioned as shown in FIG. 1 but this is a matter of custom and convenience.

The tank 12 has a bottom outlet 16 which is typically an externally threaded nipple (not shown) having a manual shut off valve (not shown) threaded onto the nipple. The outlet 16 is connected to the inlet of a assembly 18 having, as major components, an inlet union 20, a valve 22, an electrically actuated valve operator 24 and a series of outlets 26, 28, 30. A measuring tube or sight glass 32 is inserted into one of the outlets 28 for purposes more fully apparent hereinafter. It is desirable to determine the height of liquid in the measuring tube 32 so a pressure gauge 34 may be inserted into another of the outlets 30. Chemical is delivered through the remaining outlet 26 and a conduit 36 to a pump 38 delivering chemical to a pipeline 40 in which the stream of produced fluid moves. A controller 42 receives pressure information from the sensor 34 through a communications path 44, controls operation of the valve 22 and pump 38 through communication paths 46, 48, performs calculations calibrating the pump 38 and transmits information concerning the delivery of chemicals and other information through a communication system 50 to a central location which receives information from many locations similar to FIG. 1.

The union 20 includes a first or inlet union half 52 configured to connect to the tank outlet 16. Tank outlets 16 typically include a threaded nipple (not shown) to which is mounted a manual shut off valve (not shown). The union half 52 includes a sleeve 54 having external threads 56 to mate with the manual valve (not shown). A union nut 58 is slidably mounted on the body 54 and provides external wrench flats 60 and internal threads 62 to mate with threads 64 on a second union half 66. The second union half 66 includes a tubular body 68 having wrench flats 70 so the union 20 can be tightened with wrenches without applying a wrench to the valve 22. The union half 66 includes a seal insert 71 to seal against a flat surface in the union half 52 as is conventional.

It may be that an asymmetric load applied to the assembly 18 would allow the threads 62, 64 to be tightened or loosened in such a way to place the measuring tube 32 off vertical. The tube 32 need not be exactly vertical and operation of the system 10 can tolerate some divergence from vertical but using pressure to determine the height of liquid in the measuring tube depends on a reasonably upright measuring tube 32. An important advantage of the union 20 is the provision of an antirotation device preventing rotation of the second union half 66 relative to the first union half 52 as may be allowed by the mating threads 62, 64. To this end, one or more projections 72 are provided on one of the union halves 66 and one or more recesses 74 are provided on the other union half 52 so the projection 72 and recess 74 interdigitate when the union 20 is assembled by tightening the union nut 58 on the threads 64. This prevents relative rotation between the union halves 52, 66 and consequent misalignment of the measuring tube 32.

The valve 22 may be a conventional two way ball valve having a valve housing 76 and valve seats 78 captivated against a valve ball 80 by a flange or end cap 82 provided by the second union half 66 and a flange or end cap 84 provided by an outlet fitting 86. The passage through the valve ball 80 may preferably be the same size as the passage through the end caps 82, 84. The end caps 82, 84 may be affixed to the valve housing 76 in any suitable manner such as by bolt and nut assemblies 88. The valve ball 80 is manipulated as by rotating the valve ball 90° between open and closed positions by the electric valve operator 24 which may be of conventional design.

The outlet fitting 86 includes a tubular section or sleeve 90 of sufficient length to position the outlets 26, 28, 30 far enough from the valve 22 and/or the operator 24 to accommodate sight glasses 32 of different cross-sectional size. Typical sight glasses 32 are cylindrical but this is a matter of custom and convenience. The fitting 86 may be a four way fitting having an inlet 92 and the outlets 26, 28, 30. The outlets includes passages 94, 96, 98 which are coplanar in the sense that a common plane 100 passes through at least two and may preferably pass through all three. It may be preferable that the common plane 100 passes through the center of each passage 94, 96, 98. It will be seen that a flow axis 102 through the union 20 and fitting 86 is transverse to the plane 100 and, in some embodiments, perpendicular to the plane 100.

Pressure on top of the measuring tube 32 may be equalized to pressure in the tank 12 in any suitable manner, either by exposing both to atmospheric pressure or by a conduit 104 connecting the top of the tube 32 to the top of the tank 12 which is typically vented to atmosphere. In this manner, the liquid level 14 in the tank 12 may be the same as liquid level in the sight glass 32 when the valve 22 is open and the levels stabilize. This is an advantage because an initial pressure reading of a stabilized level in the sight glass 32 can be used to determine the height of liquid in the tank 12 for purposes more fully explained hereinafter. The outlet 28 may be perpendicular to the axis 102 of the valve 22 so a pressure reading of the sight glass 32 and the internal diameter of the sight glass 32 produces, in a simple calculation, the volume of liquid in the sight glass 32.

Although the pump 38 may be of any suitable type, the pump 38 may be a small capacity solar powered piston pump of a type currently available on the market. No check valve is needed to prevent backflow into the sight glass 32 because the pump 38 prevents it. Although the inlet and outlets 26, 28, 36 are illustrated as female threaded connections, any suitable connection is operable.

With the pump 38 turned off, and the valve 22 open, pressure in the sight glass 32 equalizes with pressure in the tank 12 which is recorded by the sensor 34 at time $t_1$. The valve 22 is then closed, isolating the sight glass 32 from the tank 12 and isolating liquid in the sight glass 32. The pump 38 is then turned on and operated until time $t_2$ when the pump 38 is turned off and pressure is, again determined by the sensor 34. The amount of liquid withdrawn from the sight glass 32 may be determined by converting the pressure difference into a height difference in the sight glass 32 and then converting the height difference in the sight glass 32 into volume because the cross-sectional area of the sight glass 32 is known. The pumped volume may be related to operation of the pump 38 either as a volume per unit time of operation or volume per pump cycle or pump stroke in the case of piston type pumps, thereby calibrating the pump 38. Between calibrations, the valve 22 is opened and the amount of liquid delivered from the tank 12 is dictated by the controller 42 by actuating the pump 38 to produce the desired volume of liquid as may be input into the controller 42 either at the location of the system 10 or from the central location where many systems are monitored.

In the alternative, the pump 38 may be turned on and operated until a predetermined pressure is determined by the sensor 34 and then stopped when the time elapsed is recorded. In either event, the amount of liquid withdrawn from the sight glass 32 may be determined in a straight forward manner and the pump 38 calibrated either in volume per unit time, in volume per pump cycle or any other suitable measure.

Calibrating the pump 38 in this manner may be done at suitable intervals to control operation of the system 10 so an appropriate amount of chemical is dispensed from the tank 12. This may be done as a function of pumping time or the number of pump cycles. In addition, the amount of pumped chemical may be in response to measurement of fluid flow in the pipeline 40, as by a suitable meter 106 delivering a signal to the controller 42 via a suitable electrical path or other communication link 108. In this manner, the amount of chemical injected into the pipeline 40 may be in proportion to the volume of the production stream.

An important advantage of the system 10 is the incorporation of a communication system 50 and the ability to transmit data from the system 10 either by wire or via an antenna 100 for radio, microwave, telephone or other suitable transmission system. In this manner, an individual at a central location has the ability to monitor operation of many hydrocarbon wells or other operations located remotely. Such an observer can not only monitor operation of the system 10 to determine that an appropriate amount of chemical is being dispensed but can also detect impending problems.

An observation by the pressure sensor 34 when the liquid levels in the tank 12 and sight glass 32 stabilize can be used to determine the liquid level in the tank 12. When such values are transmitted to a central location, they can be accumulated and incorporated into a report. When the liquid level of any tank or tanks 12 approaches empty, an order may be issued to a supplier to refill the tank or tanks 12.

An advantageous feature of the system 10 is a low load applied to the tank outlet 16. In one sense, the weight of the system 10 applies a torque load to the outlet 16. Manifestly, a large load runs the risk of breaking off the tank outlet 16 thereby discharging contents of the tank 12 onto the ground and incurring considerable costs of chemical and clean up but mostly lost production from having to shut in a well or wells serviced by the system 10. At lower loads, the ends of the tank 12 and the tank outlet 16 are subject to creep due to time and temperature, particularly if the tank 12 is made of a typical polymer which is the current standard in the operation of hydrocarbon wells. By minimizing the torque load on the tank outlet 16, a great deal of grief may be avoided. Accordingly, the torque load of the union 20, valve 22, operator 24, fitting 86, empty sight glass 32 and pressure sensor 34 may preferably be below 25 inch pounds and may ideally be below 20 inch pounds. It is accordingly advantageous to have components of the least weight commensurate with performance.

There is surely a minimum torque load of the union 20, valve 22, operator 24, fitting 86, empty sight glass 32 and pressure sensor 34. Metal devices made in accordance with FIGS. 2 and 3 weigh about five pounds and the addition of the pressure sensor 34 and empty sight glass 32 adds less than two pounds. Making the device of FIGS. 2 and 3 of plastic and shortening the fitting 86 cannot reduce the weight of the assembly 18 by half, meaning that the minimum torque load of the union 20, valve 22, operator 24, fitting 86, empty sight glass 32 and pressure gauge 34 is about fourteen inch pounds. In accordance with a device offered for sale, the length of the assembly of FIGS. 2-3 is about six inches, meaning that the lever arm of the assembly acting on a manual shut off valve (not shown) on the tank outlet 16 is about three inches. The weight of the assembly of FIGS. 2-3 is about five pounds, the weight of the pressure gauge 34 and empty sight glass 32 is less than two pounds, so the torque applied to the tank outlet 16 is less than twenty inch pounds.

The union 20 has an important advantage. It is highly desirable that the sight glass 32 be vertical so a pressure measurement is an accurate measure of the height of liquid in the sight glass 32. If the valve 22 is screwed directly onto the tank outlet 16, it would be very difficult to get the sight glass 32 nearly vertical and have a tight connection between the outlet 16 and its mating tank fitting. With a standard union, a level (not shown) can be placed alongside the sight glass 32 while the union is tightened thereby assuring that the sight glass 32 is vertical. With the modified union 20, the large number of recesses 74 allows nearly vertical positioning of the sight glass 32 without attempting further tightening or loosening of the threads 56 relative to the tank outlet 16.

During installation, any existing tank outlet may be modified by removing a manual shut off valve (not shown) and nipple (not shown) from its fitting on the tank 12 and a union half 52 threaded into the existing tank fitting. The union half 52 then becomes the tank outlet 16 and further reduces the moment arm of the assembly 18.

During installation, it may be preferred to position the conduit 36 on the side of the fitting 86 that tightens the threads 56 on the tank outlet 16. In other words, when looking at the fitting 86 from the free end thereof, it may be preferred to have the pump conduit 36 on the right side. The reason is that the weight of the pressure sensor 34 is known but the load applied by the pump conduit 36 is unknown but almost surely larger than the weight of the pressure sensor 34. Thus, if the pump conduit 36 is on the right side of the fitting 86, the tendency of any asymmetric load applied by the assembly 18 to the threads 56 tends to tighten the connection with the pump outlet 16. With proper tightening technique, there is much less rotation possible when tightening rather than when loosening.

The fitting 86 provides many important advantages of the system 10. The gauge member 32 can readily be positioned vertically. The connections to the pressure sensor 34 and the conduit 36 do not increase the length of the assembly cantilevered on the end of the tank outlet 16 thereby minimizing the torque applied to the tank outlet 16. Because the outlets 26, 28, 30 are in a common plane, any torque applied around the axis 102 by the conduit 36 is offset by counter-rotational torque applied by the pressure sensor 34. This minimizes any tendency of the pressure sensor 34 or the conduit 36 to rotate the second union half 66. The moment arm and weight of the pressure sensor 34 is known but the moment arm and weight of the conduit 36 may be variable or unknown at any particular location. In these situations, it may be desirable for any torque applied by the conduit 36 to the assembly 18 be in a thread tightening direction.

Referring to FIG. 9, there is illustrated a modified system 112 which differs from FIG. 1 only in the provision of a drop 114 between the tank outlet 116 and the inlet to valve 118. The drop 114 may comprise a simple Z-shaped fitting. This lowers the sight glass 120 by the height of the drop 114 and allows accurate calibration of the pump 122 even when the liquid level in the tank 124 becomes very low, i.e. approaches the level of the tank outlet 116. Because the top of the sight glass 120 in FIG. 9 is at least as tall as the top of the tank 124, accurate calibrations may be obtained when the tank 124 is completely full. Reporting low tank volumes is not a problem in the embodiment of FIG. 9 because the height of the drop 114 is known, can be entered into a data base of each particular system 112 and thereby can be used to correct the calculated height of liquid in the tank 124. Without this correction, the calculated height of liquid in the tank 124 will be too great by the height of the drop 114.

Figure 11:
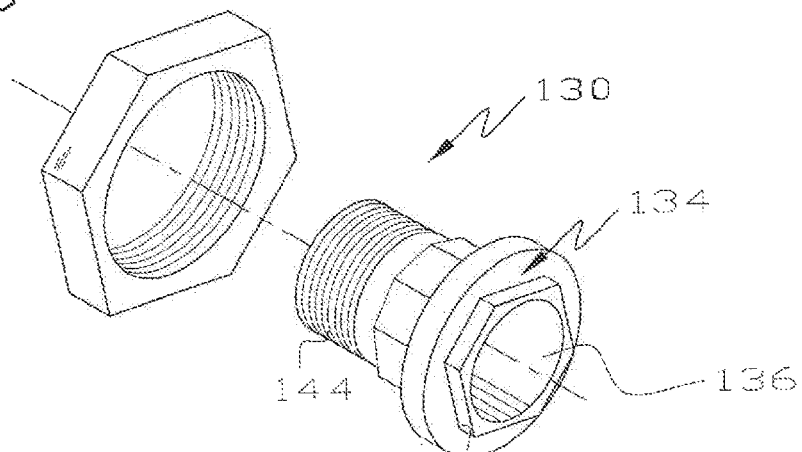
FIG. 11 is an isometric view of one union half of FIG. 10.
Figure 12:
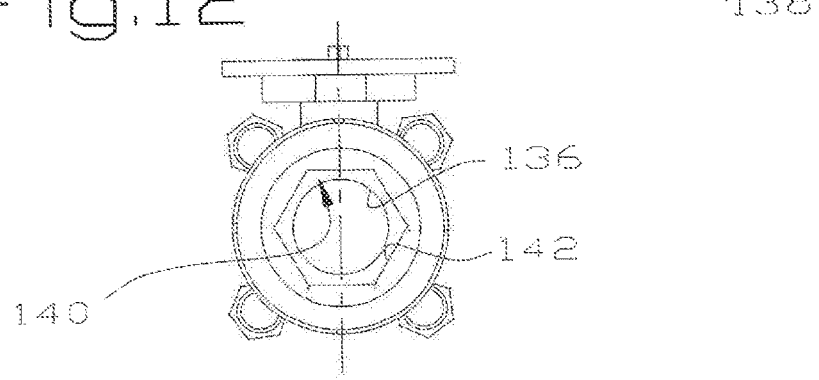
FIG. 12 is an end view of the union half mating with the union half of FIG. 10.

Referring to FIGS. 10-12, there is illustrated a union 128 having another embodiment of an antirotation device preventing rotation between union halves 130, 132. The union halves 130, 132 are substantially identical to the union halves 52, 66 except that the toothed rim of FIG. 5 and projections 72 have been replaced by a polygonal antirotation device. The union half 130 may include a polygonal projection 134 surrounding the flow passage 136 and including a series of planar faces 138 which nest in a polygonal recess 140 provided by the union half 132 and having a series of planar faces 142. It will be seen that the mating polygons 134, 140 prevent rotation between the union halves 130, 132. The arrangement of FIGS. 10-12 has a machine time advantage over the arrangement of FIG. 5 and a tolerance advantage because of the large planar faces 138, 142.

The union 128 of FIGS. 10-12 appears to have a disadvantage because there are fewer angular adjustments provided by the interdigitating elements 134, 140 when compared to the interdigitating elements 72, 74 but this disadvantage is only superficial. For example, a polygonal antirotation device with x number of faces, can position the measuring glass 32 in a range of zero to 360/2x degrees from vertical. This difference can easily be accommodated by the threaded connection between the threads 144 and the manual valve (not shown) of the tank outlet 16 and/or between the threads between the manual valve (not shown) and the nipple (not shown) to which it connects.

Installation of the system 10 is very simple. Basically, the union 20, valve 22 and fitting 86 are assembled on the end of the tank outlet 16. The valve operator 24, the pressure sensor 34 and the pump 38 are connected to the controller 42 by the electrical paths 46, 44, 48. The controller 42 is activated and the system 10 tested to see if data is being transmitted by the antenna 110 or other transmission device.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the appended claims.

I claim:

1. A chemical delivery system comprising
a union having first and second union halves, the first union half having threads configured to be threadably connected to an outlet of a tank and having a union nut for connection to the second union half, the union providing a flow axis from the tank;
a valve having an inlet end receiving flow from the second union half, an outlet and an electric valve operator for moving the valve between open and closed positions; and
an outlet fitting providing a first passage communicating with the valve outlet, a second passage configured to receive a pressure sensor, a third passage configured to receive a measuring tube of known cross-sectional shape and a fourth passage configured to receive a conduit leading to an inlet of a pump, the second, third and fourth passages having a common plane passing therethrough, the common plane being transverse to the flow axis;
the union, valve, valve operator and outlet fitting configured to produce a torque load on the tank outlet of less than 25 inch pounds,
the chemical delivery system being configured to deliver a quantity of chemical from the tank into the measuring tube and then closing the valve to isolate the measuring tube from the tank, determining the height of chemical in the measuring tube at the beginning of an interval, operating the pump and withdrawing chemical from the measuring tube while measuring the extent of operation of the pump, determining a volume correlation between pump output and pump operation time and then delivering chemical from the tank as a function of the volume correlation.

2. The chemical delivery system of claim 1 wherein centers of the second, third and fourth passages reside in the common plane, the first passage being transverse to the common plane.

3. The chemical delivery system of claim 1 wherein the third passage includes an upwardly facing opening configured to hold the measuring tube in an upright position.

4. The chemical delivery system of claim 1 wherein the second and fourth passages open laterally away from the valve.

5. The chemical delivery system of claim 1 wherein the first and second union halves comprise an antirotation device in addition to the threads on the first union half, the antirotation device being configured to prevent rotation of the second union half relative to the first union half about the flow axis through the union and wherein the antirotation device includes interdigitating elements on the first and second union halves.

6. The chemical delivery system of claim 1 wherein the union, valve, valve operator and outlet fitting are configured to produce a torque load on the tank outlet of less than 20 inch pounds.

7. A chemical delivery system comprising
a union having first and second union halves and a union nut threadably connecting the union halves, the first union half having threads configured to be threadably connected to an outlet of a tank, the union providing a flow axis from the tank;
a valve having an inlet end receiving flow from the second union half, an outlet and an electric valve operator for moving the valve between open and closed positions; and
an outlet fitting providing a first passage communicating with the valve outlet, a second passage configured to receive a pressure sensor, a third passage configured to receive a measuring tube of known cross-sectional shape and a fourth passage configured to receive a conduit leading to an inlet of a pump, the second, third and fourth passages having a common plane passing therethrough, the common plane being transverse to the flow axis.

8. The chemical delivery system of claim 7 wherein centers of the second, third and fourth passages reside in the common plane, the first passage being transverse to the common plane.

9. The chemical delivery system of claim 7 wherein the third passage includes an upwardly facing opening configured to hold the measuring tube in an upright position.

10. The chemical delivery system of claim 9 wherein the second and fourth passages open laterally away from the valve.

11. The chemical delivery system of claim 9 wherein the first and second union halves comprise an antirotation device in addition to the threads on the first union half, the antirotation device being configured to prevent rotation of the second union half relative to the first union half about the flow axis.

12. A chemical delivery system comprising
   a union having first and second union halves and a union nut threadably connecting the union halves, the first union half having threads configured to be threadably connected to an outlet of a tank, the union providing a flow axis from the tank, the first and second union halves having an antirotation device in addition to the threads on the first union half, the antirotation device being configured to prevent rotation of the second union half relative to the first union half about the flow axis through the union;
   a valve having an inlet end receiving flow from the second union half, an outlet and an electric valve operator for moving the valve between open and closed positions; and
   an outlet fitting providing a first passage communicating with the valve outlet, a second passage configured to receive a pressure sensor, a third passage configured to receive a measuring tube of known cross-sectional shape and a fourth passage configured to receive a conduit leading to an inlet of a rump;
   the chemical delivery system being configured to deliver a quantity of chemical from the tank outlet into the measuring tube and then closing the valve to isolate the measuring tube from the tank outlet, determining the height of chemical in the measuring tube at the beginning of an interval, operating the pump and delivering chemical through the pump inlet and withdrawing chemical from the measuring tube while measuring the extent of operation of the pump, determining a volume correlation between pump output and pump operation time and then delivering chemical from the tank as a function of the volume correlation.

13. The chemical delivery system of claim 12 wherein the antirotation device comprises at least one projection on one of the union halves and multiple recesses on the other union half, the at least one projection and the multiple recesses being configured to allow an angular adjustment of valve relative to the flow axis.

14. The chemical delivery system of claim 12 wherein the antirotation device comprises multiple projections on one of the union halves and at least one recess on the other union half, the multiple projections and the at least one recess being configured to allow an angular adjustment of the valve relative to the flow axis.

15. The chemical delivery system of claim 12 wherein the antirotation device comprises a recess of predetermined shape on one of the union halves and a projection on the other union half, the projection and recess being configured to allow an angular adjustment of the valve relative to the flow axis.

16. The chemical delivery system of claim 12 wherein the antirotation device comprises a recess of polygonal shape on one of the union halves and a polygonal projection on the other union half, the projection and recess being configured to allow an angular adjustment of the valve relative to the flow axis.

17. The chemical delivery system of claim 12 wherein the outlet fitting comprises the second, third and fourth passages having a common plane passing therethrough, the common plane being transverse to the flow axis, the union, valve, valve operator and outlet fitting configured to produce a torque load on the tank outlet of less than 25 inch pounds.

* * * * *